(12) United States Patent
Grise et al.

(10) Patent No.: US 7,996,807 B2
(45) Date of Patent: Aug. 9, 2011

(54) INTEGRATED TEST WAVEFORM GENERATOR (TWG) AND CUSTOMER WAVEFORM GENERATOR (CWG), DESIGN STRUCTURE AND METHOD

(75) Inventors: Gary D. Grise, Colchester, VT (US);
Vikram Iyengar, Pittsburgh, PA (US);
David E. Lackey, Jericho, VT (US);
David W. Milton, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 12/104,461

(22) Filed: Apr. 17, 2008

(65) Prior Publication Data
US 2009/0265677 A1 Oct. 22, 2009

(51) Int. Cl.
*G06F 17/50* (2006.01)
(52) U.S. Cl. ......... 716/126; 716/101; 716/113; 716/136
(58) Field of Classification Search .................. 716/101, 716/113, 126, 136
See application file for complete search history.

(56) References Cited

U.S. PATENT DOCUMENTS

| 6,507,230 | B1 | 1/2003 | Milton |
| 6,760,873 | B1 * | 7/2004 | Hao et al. ............ 714/724 |
| 2006/0230302 | A1 | 10/2006 | Tsai |

OTHER PUBLICATIONS

Iyengar, et al., "A Flexible and Scalable Methodology for GHz-Speed Structural Test," IEEE Symp. on VLSI, 2006.
Iyengar, et al., "At-Speed Structural Test for High-Performance ASICs," IEEE, 2006.

* cited by examiner

*Primary Examiner* — Thuan Do
(74) *Attorney, Agent, or Firm* — Gibb I.P. Law Firm, LLC; Richard M. Kotulak, Esq.

(57) ABSTRACT

Disclosed are embodiments of a clock generation circuit, a design structure for the circuit and an associated method that provide deskewing functions and that further provide precise timing for both testing and functional operations. Specifically, the embodiments incorporate a deskewer circuit that is capable of receiving waveform signals from both an external waveform generator and an internal waveform generator. The external waveform generator can generate and supply to the deskewer circuit a pair of waveform signals for functional operations. The internal waveform generator can be uniquely configured with control logic and counter logic for generating and supplying a pair of waveform signals to the deskewer circuit for any one of built-in self-test (BIST) operations, macro-test operations, other test operations or functional operations. The deskewer circuit can selectively gate an input clock signal with the waveform signals from either the external or internal waveform generator in order to generate the required output clock signal.

20 Claims, 4 Drawing Sheets

INTEGRATED TEST WAVEFORM GENERATOR (TWG) AND CUSTOMER WAVEFORM GENERATOR (CWG), DESIGN STRUCTURE AND METHOD

FIELD OF THE INVENTION

The embodiments of the invention generally relate to waveform generators, and, more particularly, to an integrated clock generation circuit for test operations and functional operations, an associated design structure and an associated method.

DESCRIPTION OF THE RELATED ART

Clock generation circuits provide precise timing to allow digital circuits to work properly during functional operations. A typical clock generation circuit generates an output clock signal with a series of high and low pulses at a fixed frequency. The rising and falling edges of the output clock signal are then used as a reference for critical actions within digital circuits. For example, they can be used to synchronize bus cycles or initiate data operations (e.g., as discussed in U.S. Pat. No. 6,507,230 of Milton et. al., issued on Jan. 14, 2003 and incorporated herein by reference). Milton further discloses that, when multiple clock generators are utilized to feed clock signals to different digital logic circuits within an integrated circuit structure, a difference in delay time (i.e., skew) among the clock signal inputs to various digital circuits inevitably results. Therefore, Milton discloses a clock generation circuit that incorporates both a waveform generator for generating a pair of waveform signals clocked by an input clock signal and a deskewer for gating the pair of waveform signals with the same input clock signal in order to generate an output clock signal that is synchronously linked to the input clock signal.

Such clock generation circuits, with deskewing functions, are similarly used to provide precise timing to allow digital circuits to work properly under test. However, in order to test under defined test specifications (e.g., defined timing requirements), separate and discrete clock generation circuits are used at test (i.e., the same clock generation circuits are not used for both testing and functional operations). The requirement for separate testing and functional clock generation circuits results in significant area costs and limits the matching of at-speed structural test (ASST) operations with end-user functional operations. Thus, there is a need in the art for a clock generation circuit that integrates clock gating for both testing and functional operations. Such a clock generation circuit would allow end-users (e.g., customers) to use the same clock generation circuit during functional operation as testers use during test operations, thereby providing significant area benefits. Furthermore, such a clock generation circuit would ensure that ASST operations are better matched to end-user functional operations.

SUMMARY

In view of the foregoing, disclosed herein are embodiments of a clock generation circuit that provides deskewing functions and that further provides precise timing for both testing and functional operations. Specifically, the embodiments incorporate a deskewer circuit that is capable of receiving waveform signals from both an external waveform generator and an internal waveform generator. The external waveform generator can generate and supply to the deskewer circuit a pair of waveform signals for functional operations. The internal waveform generator can be uniquely configured with control logic and counter logic for generating and supplying a pair of waveform signals to the deskewer circuit for any one of built-in self-test (BIST) operations, macro-test operations, other test operations, or functional operations. The deskewer circuit can selectively gate an input clock signal with the waveform signals from either the external or internal waveform generator in order to generate the required output clock signal. Also disclosed are embodiments of an associated design structure for the clock generation circuit and an associated method for generating a clock signal.

More specifically, disclosed herein are embodiments of a clock generation circuit that comprises a first waveform generator (i.e., a waveform generator internal to the clock generation circuit) and also a deskewer circuit.

The internal waveform generator can comprise a controller and a counter that are each clocked by an input clock signal. The controller can be in communication with both the counter and the deskewer circuit and can further be adapted to control the operations of both the internal waveform generator itself and the deskewer circuit. The counter can similarly be in communication with both the controller and the deskewer circuit. The counter can be adapted to receive a plurality of output clock signal specifications, to generate a pair of first waveform signals based on the received output clock signal specifications, and to transmit the generated pair of first waveform signals to the deskewer circuit.

The output clock signal specifications received by the counter can comprise output clock signal specifications for built-in self-test (BIST) operations supplied to the counter from a BIST engine via inputs to a plurality of BIST registers in communication with the counter. The BIST engine-supplied inputs can comprise, for example, mode, divide-by and width inputs. The output clock signal specifications received by the counter can also comprise output clock signal specifications for macro- or other test operations or functional operations supplied to the counter from a user (e.g., a tester or end-user (i.e., a customer)) via inputs to the controller. The user-supplied inputs can comprise the same type of inputs supplied by the BIST engine as well as additional inputs for on demand control of the clock generation circuit (e.g., to locally start and stop a free-running clock input on demand without delay). As mentioned above, the controller is adapted to control operations of the waveform generator. In light of the various input sources, the controller can be adapted to control selection by the counter between generation of the pair of first waveform signals based on built-in self test (BIST) engine-supplied output clock signal specifications and generation of the pair of first waveform signals based on user-supplied output clock signal specifications.

The deskewer circuit can be adapted to receive this pair of first waveform signals from the internal waveform generator. The deskewer circuit can further be adapted to receive a pair of second waveform signals from a second waveform generator (i.e., a different waveform generator external to the clock generation circuit) as well as the input clock signal. Unlike prior art deskewer circuits, the deskewer circuit disclosed herein is further adapted to selectively gate the input clock signal with either the pair of first waveform signals from the internal waveform generator for testing and/or functional operations or the pair of second waveform signals from an external waveform generator for functional operations. Either way, the deskewer circuit generates an output clock signal that is essentially synchronously linked to the input clock signal and further allows the same clock path to be used for deskewing both the pair of first waveform signals during testing and/or functional operations and the pair of second waveform signals during functional operations. As mentioned above, the controller in the internal waveform generator can be in communication with the deskewer circuit and can be adapted to control the operations of the deskewer circuit. Particularly, the controller can be adapted to control (e.g., based on user inputs), the selection of either the pair of first waveform signals from the internal waveform generator for gating with the input clock signal or the pair of second waveform signals from an external waveform generator for gating with the input clock signal.

Specifically, the deskewer circuit can comprise a pair of gates, a first set of parallel connected latches, a second set of parallel connected latches and a multiplexer all connected in series and clocked by the same input clock signal. Each gate in the pair of the gates can be adapted to receive one first waveform signal of the signal pair from the first waveform signal generator and one second waveform signal of the signal pair from the second waveform signal generator. In response to a data select signal supplied by the controller, the pair of gates will output either a selected pair of first waveform signals or a selected pair of second waveform signals to the first set of parallel connected latches. In particular, each waveform signal from a selected pair is transmitted to a corresponding latch in the first set of parallel connected latches. The first set of parallel connected latches, the second set of parallel connected latches and the multiplexer connected in series can be adapted to then process the selected pair of waveform signals in order to generate an output clock signal that it is essentially synchronously linked to the input clock signal. Optionally, the deskewer circuit can further comprise a second pair of gates connected in series between the second set of parallel connected latches and the multiplexer. This second pair of gates can be adapted to allow selective gating of additional input clock signals during generation of the output clock signal.

Also disclosed herein are embodiments of an associated clock generation method. Specifically, the method embodiments comprise providing a clock generation circuit, such as the clock generation circuit described above. The method embodiments then comprise receiving, by the first waveform generator, of output clock signal specifications supplied by either a built-in self-test (BIST) engine for test operations and/or a user for either functional operations or macro- or other test operations. The output clock signal specifications can comprise, for example, mode inputs, divide by inputs and width inputs.

Next, the method embodiments can comprise using, by the internal waveform generator, of an input clock signal to generate a pair of first waveform signals based on the received output clock signal specifications. For example, the process of generating the pair of first waveform signals can comprise dividing the input clock signal based on a divide by input in the output clock signal specifications. The generated pair of first waveform signals is then transmitted to the deskewer circuit within the clock generation circuit.

The method embodiments can further comprise receiving, by the deskewer circuit, of the pair of first waveform signals from the internal waveform generator, a pair of second waveform signals from a second waveform generator (e.g., from a waveform generator external to the clock generation circuit), and also the input clock signal. Next, the input clock signal is selectively gated with either the pair of first waveform signals from the internal waveform generator or the pair of second waveform signals from the external waveform generator in order to generate an output clock signal that is essentially synchronously linked to the input clock signal. Optionally, during this selectively gating process, additional input clock signals can also be selectively gated. That is, other clocks signals can be brought in as separate inputs.

The method embodiments disclosed herein allow for using a same clock path for deskewing both the pair of first waveform signals and the pair of second waveform signals and further allow for locally starting and stopping a free-running clock input on demand without delay.

Also disclosed herein are embodiments of a design structure for the above-described circuit. This design structure can be embodied in a machine readable medium, can reside on storage medium as a data format used for the exchange of layout data of integrated circuits and can comprise, for example, a netlist.

These and other aspects of the embodiments of the invention will be better appreciated and understood when considered in conjunction with the following description and the accompanying drawings. It should be understood, however, that the following descriptions, while indicating embodiments of the invention and numerous specific details thereof, are given by way of illustration and not of limitation. Many changes and modifications may be made within the scope of the embodiments without departing from the spirit thereof, and the embodiments include all such changes and modifications.

BRIEF DESCRIPTION OF THE DRAWINGS

The embodiments of the invention will be better understood from the following detailed description with reference to the drawings, in which.

DETAILED DESCRIPTION OF EMBODIMENTS

Figure 1:
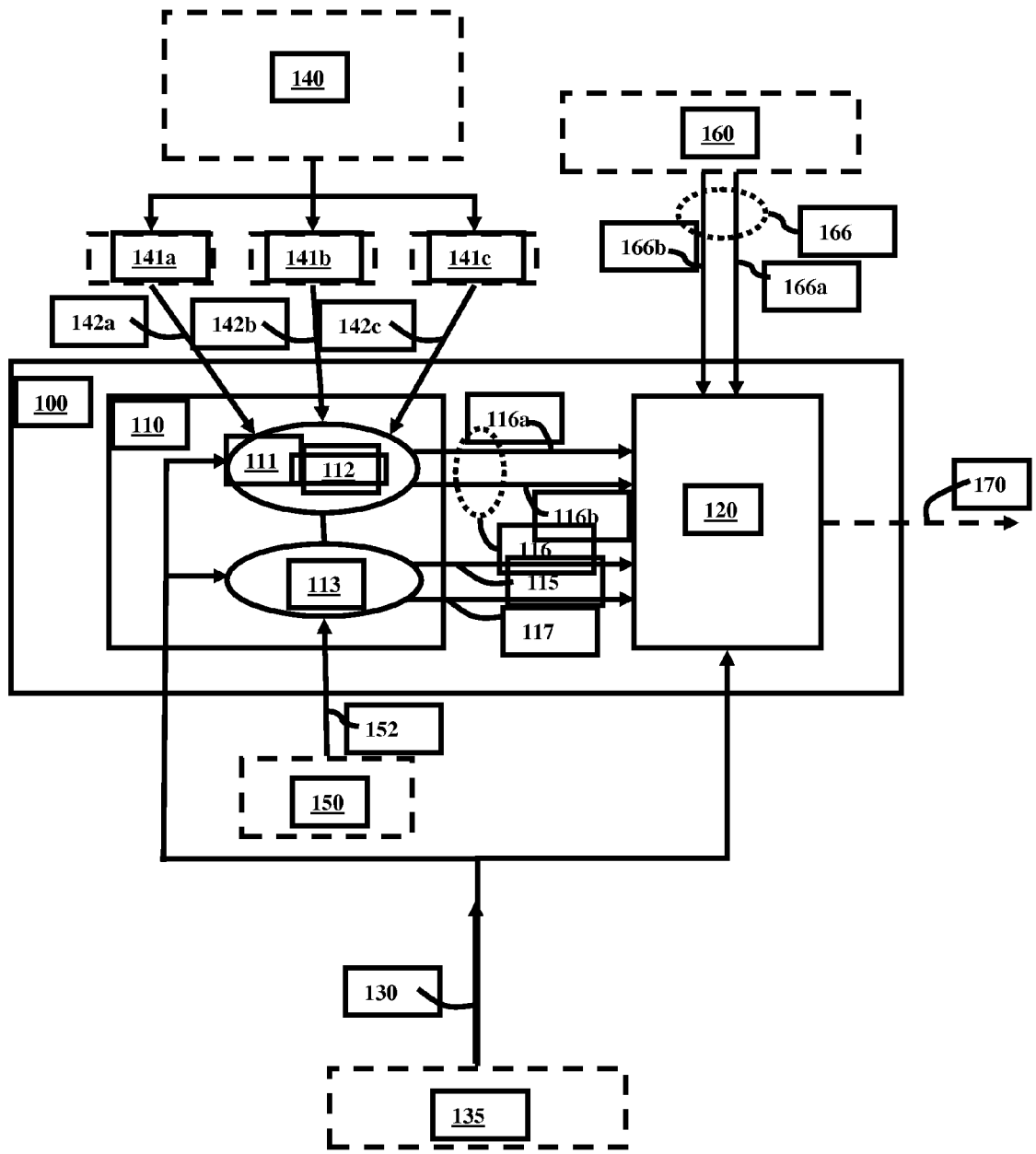
FIG. 1 is a schematic block diagram illustrating an embodiment of a clock generation circuit.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned above, separate and discrete clock generation circuits are typically used for testing operations and for functional operation in digital circuits. The requirement for separate testing and functional clock generation circuits results in significant area costs and limits the matching of at-speed structural test (ASST) operations with end-user functional operations.

In view of the foregoing, disclosed herein are embodiments of a clock generation circuit that provides deskewing functions and that further provides precise timing for both testing and functional operations. Specifically, the embodiments incorporate a deskewer circuit that is capable of receiving waveform signals from both an external waveform generator and an internal waveform generator. The external waveform generator can generate and supply to the deskewer circuit a pair of waveform signals for functional operations. The internal waveform generator can be uniquely configured with control logic and counter logic for generating and supplying a pair of waveform signals to the deskewer circuit for any one of built-in self-test (BIST) operations, macro-test operations, other test operations or functional operations. The deskewer circuit can selectively gate an input clock signal with the waveform signals from either the external or internal waveform generator in order to generate the required output clock signal. Also disclosed are embodiments of an associated design structure for the clock generation circuit and an associated method for generating a clock signal.

More specifically, referring to FIG. 1, disclosed herein are embodiments of a clock generation circuit 100 with a compact design (e.g., approximately 38 flip-flops). The clock generation circuit 100 embodiments comprise a first waveform generator 110 (i.e., a waveform generator internal to the clock generation circuit) and also comprise a deskewer circuit 120.

The internal waveform generator 110 can comprise a controller 113 (i.e., control logic) and a counter 111 (i.e., counter logic) that are each clocked by an input clock signal 130 (e.g., from a phase locked loop (PLL) circuit 135). The controller 113 can be in communication with both the counter 111 and the deskewer circuit 120. Additionally, the controller 113 can be adapted to control the operations of both the internal waveform generator 110 itself and the deskewer circuit 120. The counter 111 can similarly be in communication with both the controller 113 and the deskewer circuit 120. The counter 111 can be adapted to receive a plurality of output clock signal specifications, to generate a pair of first waveform signals 116 based on the received output clock signal specifications, and to transmit the generated pair of first waveform signals 116 to the deskewer circuit 120.

The output clock signal specifications received by the counter 111 can comprise output clock signal specifications for built-in self-test (BIST) operations supplied to the counter 111 from a BIST engine 140 via inputs 142a-c to a plurality of BIST registers 141a-c in communication with the counter 111. The BIST engine-supplied inputs 142a-c can comprise, for example, mode, divide-by and width inputs. The output clock signal specifications received by the counter 111 can also comprise output clock signal specifications for macro- or other test operations or functional operations supplied to the counter 111 from a user 150 (e.g., a tester or end-user (i.e., a customer)) via inputs 152 to the controller 113. The user-supplied inputs 152 can comprise the same type of inputs (e.g., mode, divide-by and width inputs) supplied by the BIST engine 140 as well as additional inputs for on demand control of the clock generation circuit 100 (e.g., to locally start and stop a free-running clock input on demand without delay). As mentioned above, the controller 113 is adapted to control operations of the internal waveform generator 110. In light of the various input sources (e.g., the BIST engine 140 or user 150), the controller 113 can be adapted to control selection by the counter 111 between generation of the pair of first waveform signals 116 based on built-in self test (BIST) engine-supplied output clock signal specifications and generation of the pair of first waveform signals 116 based on user-supplied output clock signal specifications.

Specifically, the output clock signal specifications received by the counter 111 (e.g., from the user 150 by way of the controller 111 or from a BIST engine 140 by way of BIST registers 141a-c) can comprise mode, divide-by and width inputs. The mode inputs can indicate the mode of operation for the clock generation circuit 100 and sub-modes therein. For example, the mode inputs can indicate that the internal waveform generator 110 and deskewer circuit 120 are to operate in a functional mode and, more particularly, in a "run" mode such that a continuous output clock signal is generated by the deskewer circuit 120 or an "off" mode such that no output clock signal is generated by the deskewer circuit 120. The mode inputs can, alternatively, indicate that the internal waveform generator 110 and deskewer circuit 120 are to operate in a testing mode and, more particularly, in a specified "n-pulse" mode such that an output clock signal with n-pulses (e.g., 1, 2, 4, etc. pulses) is generated by the deskewer circuit 110 with every one pulse of the input clock signal 130 or a "pass-through" mode such that the circuit is forced into a specified mode and over-rides all other controls. In an exemplary embodiment, mode inputs 142a can be supplied to the counter 111 via a BIST register 141a over a 3-bit bus which defines the mode. For example, the functional modes "run" and "off" can be represented by 000 and 111, respectively. Furthermore, the "n-pulse" and "pass-through" modes can be represented by 010, 100, 110 and 001. The state of these input bits can be captured by the counter 111 and asserted, as required.

The divide-by inputs can indicate the divide-by number to be applied by the counter 111 and, more particularly, by a divider 112 (e.g., divide-by logic) in the counter 111 to the input clock signal 130 when generating the pair of first waveform signals 116. For example, the counter 111 can comprise a divider 112 capable of dividing an input clock signal by a predetermined value (e.g., by 1 up to by 64). Thus, the inputs can specify any divide-by number from 1-64. In an exemplary embodiment, divide-by inputs 142b can be supplied to the counter 111 via a BIST register 141b over a 6-bit bus which sets the divider 112. To use such a divider 112, the counter 111 is zero-indexed and loaded with a number that is one less than the divisor of the ratio being sought. For example, 000000 will correspond to a divide by 1, 000001 will correspond to a divide by 2, 000011 will correspond to a divide by 3, and so on. This indicates how many incoming clock cycles should correspond to each output cycle. That is, a value of 0 (i.e., a divide by 1 represented by 000000) means every incoming clock cycle results in an output cycle. A value of 1 (i.e., a divide by 2 represented by 000001) means every other (i.e., every second) incoming clock cycle will result in an output clock cycle. A value of 2 (i.e., a divide by 3 represented by 000011) means every third incoming clock cycle will result in an output clock cycle. The state of these input bits can be captured by the counter 111 and asserted, as required.

Finally, the width inputs can indicate the duty cycle to be applied by the counter 111 and, more particularly, by the divider 112 when generating the pair of first waveform signals 116. Specifically, the width inputs can indicate ratio of the number of cycles for which the output clock signal 170 generated by the deskewer circuit 120 will be low to the number of cycles for which the output clock signal generated by the deskewer circuit 120 will be high. This duty cycle can be any programmed duty cycle suitable for a given application. For example, for timing the functional and/or test operations of an embedded dynamic random access memory (eDRAM), the duty cycle can optimally be programmed as a 75:25 duty cycle. In an exemplary embodiment, the width inputs 142c can be supplied to the counter 111 via a BIST register 141c over a 6-bit bus which sets the number of incoming clock cycles that will have a low output. To use the width function of the divider 112, the counter 111 is zero-indexed and loaded with a number that is one less than the number of low cycles that are being sought. For example, 000000 will corresponds to 1 cycle, 000001 will correspond to 2 cycles, and so on. The state of these input bits can be captured by the counter 111 and asserted, as necessary. In this case, an edge select function can be used to determine if the falling edge of the output clock signal corresponds to the rising edge or falling edge of the first incoming clock cycle for which the output is to be low.

The deskewer circuit 120 can be adapted to receive this pair of first waveform signals 116 from the internal waveform generator 110. The deskewer circuit 120 can further be adapted to receive a pair of second waveform signals 166 from a second waveform generator 160 (i.e., a different waveform generator external to the clock generation circuit 100). The external waveform generator 160 can be used, for example, if unique clock generation requirements exist that can not adequately be generated by the internal waveform generator 110. In addition to internal and external waveform signals, the deskewer circuit 120 can also be adapted to receive the input clock signal 130.

Unlike prior art deskewer circuits, the deskewer circuit 120 disclosed herein is further adapted to selectively gate the input clock signal 130 with either the pair of first waveform signals 116 from the internal waveform generator 110 for testing and/or functional operations or the pair of second waveform signals 166 from an external waveform generator 160 for functional operations. Either way, the deskewer circuit 120 generates an output clock signal 170 that is essentially synchronously linked to the input clock signal 130 and further allows the same clock path to be used for deskewing both the pair of first waveform signals 116 during testing and/or functional operations and the pair of second waveform signals 166 during functional operations. As mentioned above, the controller 113 in the internal waveform generator 110 can be in communication with the deskewer circuit 120 and can be adapted to control the operations of the deskewer circuit 120. Particularly, the controller 113 can be adapted to control (e.g., based on user inputs 152), the selection by the deskewer circuit 120 of either the pair of first waveform signals 116 from the internal waveform generator 110 for gating with the input clock signal 130 or the pair of second waveform signals 166 from an external waveform generator 160 for gating with the input clock signal 130.

Figure 2:
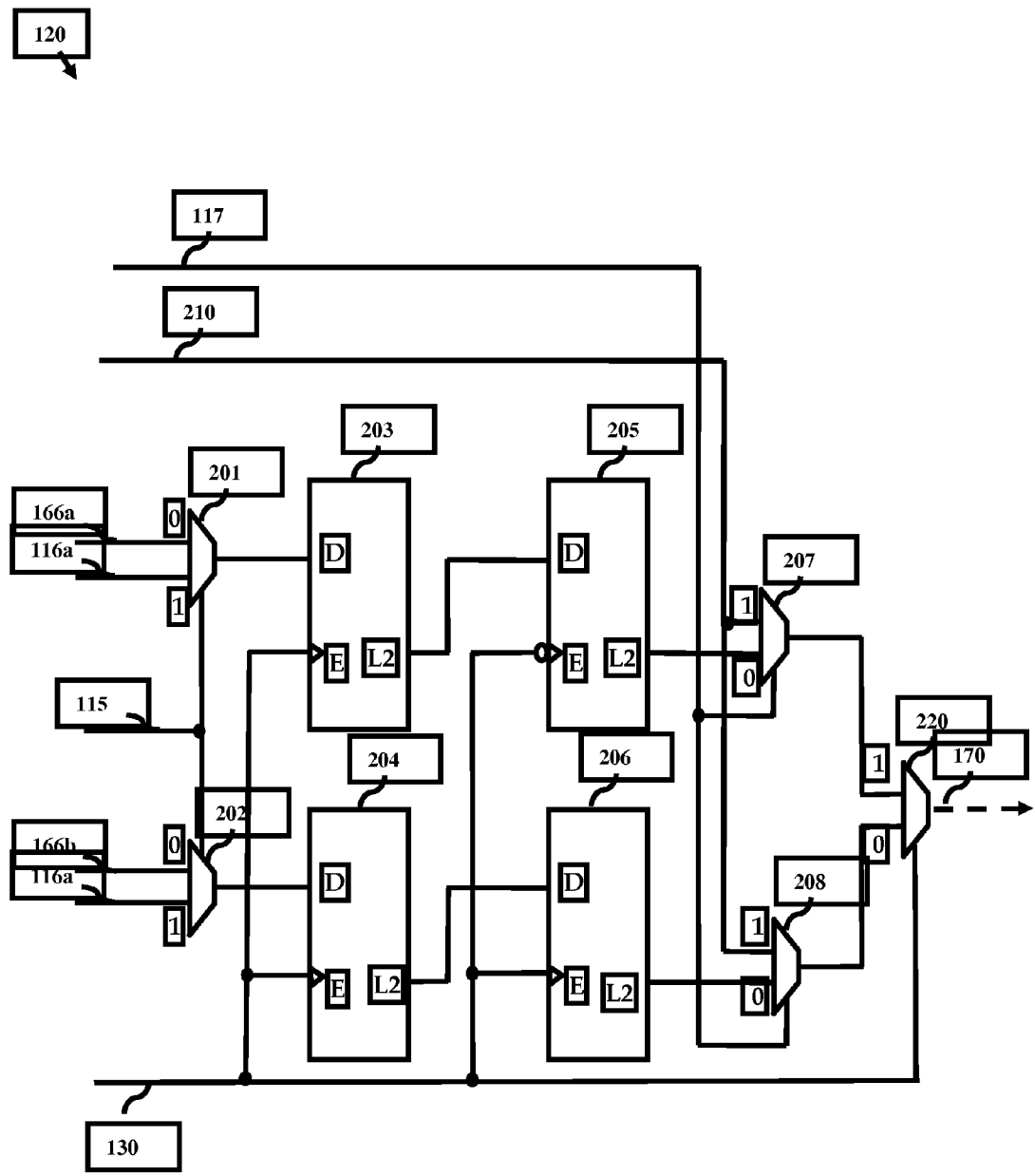
FIG. 2 is a schematic diagram illustrating an exemplary deskewer circuit that can be incorporated into the clock generation circuit of FIG. 1.

Specifically, referring to FIG. 2, the deskewer circuit 120 can comprise a pair of gates 201-202, a first set of parallel connected latches 203-204, a second set of parallel connected latches 205-206 and a multiplexer 220 all connected in series and clocked by the same input clock signal 130. Each gate 201, 202 in the pair of the gates can be adapted to receive one first waveform signal (e.g., 116a or 116b) of the signal pair 116 from the first waveform signal generator 110 and one second waveform signal (e.g., 166a or 166b) of the signal pair 166 from the second waveform signal generator 160. Each gate 201, 202 can comprise, for example, an OR gate or NOR gate connected to a single data select line 115 controlled by the controller 113 in the internal waveform generator 110. In response to a data select signal supplied via data select line 115 by the controller 113, the pair of gates 201-202 will output either a selected pair of first waveform signals 116 or a selected pair of second waveform signals 166 to the first set of parallel connected latches 203-204. In particular, each waveform signal (e.g., 116a-b or 166a-b) from a selected pair is transmitted to a corresponding latch in the first set of parallel connected latches 203-204. The first set of parallel connected latches 203-204, the second set of parallel connected latches 205-206 and the multiplexer 220 connected in series can be adapted to (i.e., configured to) then process the selected pair of waveform signals (i.e., to selectively gate the selected pair of waveform signals with the input clock signal) in order to generate an output clock signal 170 that it is essentially synchronously linked to the input clock signal 130. Specifically, the output clock signal 170 of the clock generation circuit 100 will be based on response in the latches 203-206 to incoming signal edges to provide a low skew, low distortion edge aligned clock.

Optionally, the deskewer circuit 120 can further comprise a second pair of gates 207-208 connected in series between the second set of parallel connected latches 205-206 and the multiplexer 220. This second pair of gates 207-208 can be adapted to allow selective gating of additional input clock signals 210 during generation of the output clock signal. That is, in response to a clock select input 117 supplied by the controller 113 to the gates 207 and 208, an additional clock signal 210 can be gate with the output of the second set of parallel connected latches 205-207. For example, a level sensitive scan design (LSSD) clock signal can be so gated to support LSSD functions or a test clock signal can be so gate to enable at speed multiple array built-in self-test (MABIST). These additional clock inputs avoid the need to provide a second control signal pulse (SCSP) either before or after the clock generation circuit.

Figure 3:
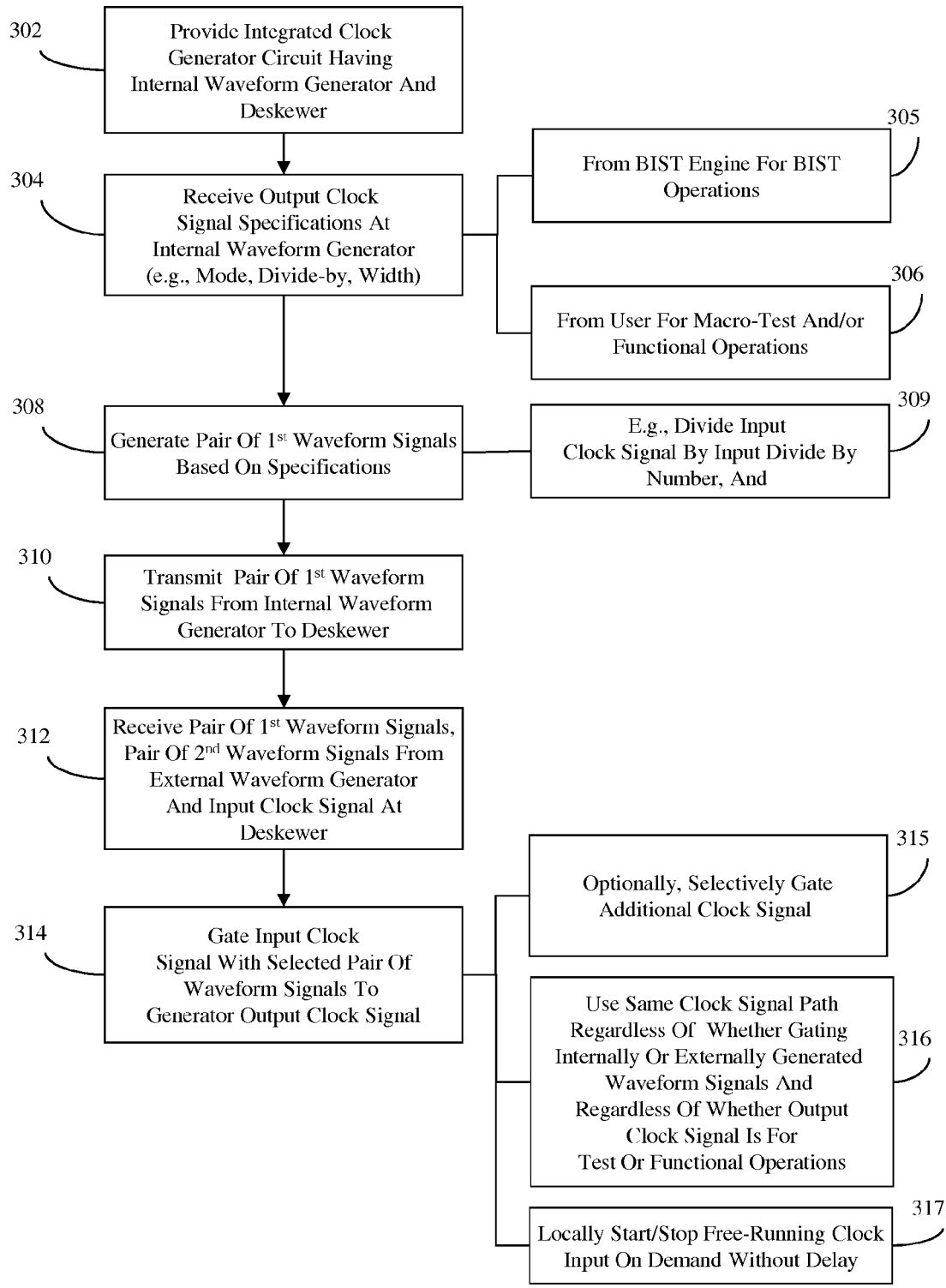
FIG. 3 is a flow diagram illustrating an embodiment of the method of the invention.

Also disclosed herein are embodiments of an associated clock generation method. Specifically, referring to the flow diagram of FIG. 3 in combination with FIGS. 1-2, the method embodiments comprise providing an integrated clock generation circuit, such as the clock generation circuit 100 described above (302). The method embodiments then comprise receiving, by the first waveform generator 110 (e.g., by the waveform generator internal to the clock generation circuit 1100), of output clock signal specifications (304). Specifically, the process 304 of receiving the output clock signal specifications can comprise receiving output clock signal specifications supplied by a built-in self-test (BIST) engine 140 for test operations (305) and/or receiving output clock signal specifications supplied by a user 150 for either functional operations or macro- or other test operations (306). The output clock signal specifications can comprise, for example, mode inputs, divide by inputs and width inputs.

Next, the method embodiments can comprise using, by the internal waveform generator 110, of an input clock signal 130 (e.g., from a phase locked loop (PLL) circuit 135) to generate a pair of first waveform signals 116 based on the received output clock signal specifications (308). For example, the process of generating the pair of first waveform signals 116 can comprise dividing the input clock signal based on a divide by input number (e.g., from 1 up to 64) in the output clock signal specifications (309). The generated pair of first waveform signals 116 is then transmitted to the deskewer circuit 120 within the clock generation circuit 100 (310).

The method embodiments can further comprise receiving, by the deskewer circuit, of the pair of first waveform signals 116 from the internal waveform generator 110, a pair of second waveform signals 166 from a second waveform generator 160 (e.g., from a waveform generator external to the clock generation circuit 100), and also the input clock signal 130 (312). Next, the input clock signal 130 is selectively gated with either the pair of first waveform signals 116 from the internal waveform generator 110 or the pair of second waveform signals 166 from the external waveform generator 160 in order to generate an output clock signal 170 that is essentially synchronously linked to the input clock signal 130 (314. Optionally, during the process of selectively gating the input clock signal with the selected pair of waveform signals and, additional input clock signals 210 can be selectively gated (315). That is, other clocks signals 210 can be brought in as separate inputs. For example, a level sensitive scan design (LSSD) clock signal can be brought in to support LSSD functions or a test clock signal can be brought in to enable at speed multiple array built-in self-test (MABIST). These additional clock inputs 210 avoid the need for providing a second control signal pulse (SCSP) either before or after the generation of the output signal clock.

The method embodiments disclosed herein allow for using a same clock path for deskewing both the pair of first waveform signals and the pair of second waveform signals, when generating an output clock signal for test and/or functional operations (316). That is, regardless of which selected pair of waveform signals is processed by the deskewer circuit 120 (i.e., regardless of whether an internally or externally generated pair of waveform signals is processed), the same clock path is used to generate the output clock signal 170. Furthermore, regardless of whether the output signal is generated for test functions (e.g., in response waveform signals generated by the internal waveform generator 110 based on BIST engine-supplied inputs or user-supplied inputs) or for functional operations (e.g., in response to waveform signals generated by an external device 16 or generated by the internal waveform generator 110 based on user-supplied inputs), the same clock path is used. Additionally, due to the provided integrated clock generation circuit structure 100, the method embodiments allow for locally starting and stopping a free-running clock input on demand without delay (317).

Figure 4:
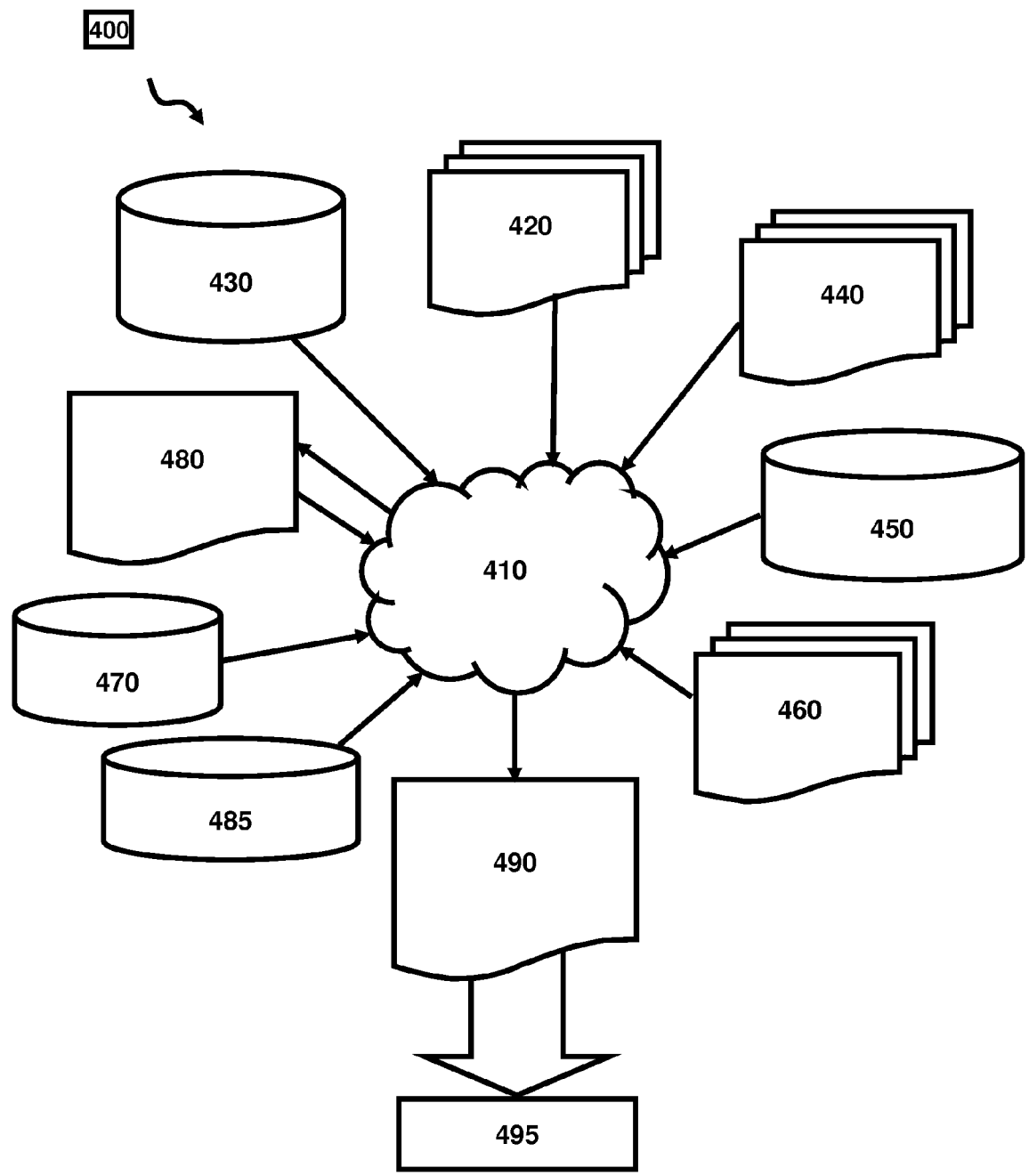
FIG. 4 is a flow diagram of a design process used in semiconductor design, manufacture, and/or test.

Also disclosed herein are embodiments of a design structure for the above-described integrated clock generation circuit. Specifically, FIG. 4 shows a block diagram of an exemplary design flow 400 used for example, in semiconductor design, manufacturing, and/or test. Design flow 400 may vary depending on the type of IC being designed. For example, a design flow 400 for building an application specific IC (ASIC) may differ from a design flow 400 for designing a standard component. Design structure 420 is preferably an input to a design process 410 and may come from an IP provider, a core developer, or other design company or may be generated by the operator of the design flow, or from other sources. Design structure 420 comprises an embodiment of the invention as shown in FIGS. 1-2 in the form of schematics or HDL, a hardware-description language (e.g., Verilog, VHDL, C, etc.). Design structure 420 may be contained on one or more machine readable medium. For example, design structure 420 may be a text file or a graphical representation of an embodiment of the invention as shown in FIGS. 1-2. Design process 410 preferably synthesizes (or translates) an embodiment of the invention as shown in FIGS. 1-2 into a netlist 480, where netlist 480 is, for example, a list of wires, transistors, logic gates, control circuits, I/O, models, etc. that describes the connections to other elements and circuits in an integrated circuit design and recorded on at least one of machine readable medium. For example, the medium may be a CD, a compact flash, other flash memory, a packet of data to be sent via the Internet, or other networking suitable means. The synthesis may be an iterative process in which netlist 480 is resynthesized one or more times depending on design specifications and parameters for the circuit.

Design process 410 may include using a variety of inputs; for example, inputs from library elements 430 which may house a set of commonly used elements, circuits, and devices, including models, layouts, and symbolic representations, for a given manufacturing technology (e.g., different technology nodes, 32 nm, 45 nm, 90 nm, etc.), design specifications 440, characterization data 450, verification data 460, design rules 470, and test data files 485 (which may include test patterns and other testing information). Design process 410 may further include, for example, standard circuit design processes such as timing analysis, verification, design rule checking, place and route operations, etc. One of ordinary skill in the art of integrated circuit design can appreciate the extent of possible electronic design automation tools and applications used in design process 410 without deviating from the scope and spirit of the invention. The design structure of the invention is not limited to any specific design flow.

Design process 410 preferably translates an embodiment of the invention as shown in FIGS. 1-2, along with any additional integrated circuit design or data (if applicable), into a second design structure 490. Design structure 490 resides on a storage medium in a data format used for the exchange of layout data of integrated circuits and/or symbolic data format (e.g. information stored in a GDSII (GDS2), GLI, OASIS, map files, or any other suitable format for storing such design structures). Design structure 490 may comprise information such as, for example, symbolic data, map files, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1-2. Design structure 490 may then proceed to a stage 495 where, for example, design structure 490: proceeds to tape-out, is released to manufacturing, is released to a mask house, is sent to another design house, is sent back to the customer, etc.

Therefore disclosed above are embodiments of a clock generation circuit, a design structure for the circuit and an associated method that provide deskewing functions and that further provide precise timing for both testing and functional operations. Specifically, the embodiments incorporate a deskewer circuit that is capable of receiving waveform signals from both an external waveform generator and an internal waveform generator. The external waveform generator can generate and supply to the deskewer circuit a pair of waveform signals for functional operations. The internal waveform generator can be uniquely configured with control logic and counter logic for generating and supplying to the deskewer circuit a pair of waveform signals for any one of built-in self-test (BIST) operations, macro-test operations, other test operations or functional operations. This pair of internally generated waveform signals can be based on BIST engine-supplied and/or user-supplied inputs for mode (e.g., functional or test), divide-by (e.g., from 1-64) and duty cycle (e.g., essentially any duty cycle). The deskewer circuit can selectively gate an input clock signal with the waveform signals from either the external or internal waveform generator in order to generate the required output clock signal.

The above-disclosed embodiments use a compact design (e.g., approximately 38 flip-flops) to generate a low skew and low distortion edge aligned output clock signal for both testing and functional operations and, more particularly, can do so using the same clock path for such testing and functional operations. Thus, the disclosed embodiments ensure that at-speed structural test (ASST) operations are better matched to end-user functional operations. Furthermore, use of the same clock path for functional and test operations necessarily provides significant area benefits. Additionally, the embodiments allow for on demand functions better control of clock generation circuit operation. For example, an on demand function can be used to locally stop or start free running clock inputs in order to reduce test power consumption without clock gating that adds delays on functional paths. Also, because the internally generated waveform signals in the disclosed embodiments can be based on various inputs for mode, divide-by (e.g., from 1-64) and duty cycle (e.g., essentially any duty cycle), a wide range of selection options for the output clock signal are proved. Finally, the design of the disclosed clock generation circuit is flexible and scalable. Hence any general integrated circuit (IC) design can include any number of such clock generation circuits (e.g., one clock generation circuit per functional clock domain). Moreover, no special finite-state machines are needed on a per-IC basis and the same clock generation circuit disclosed herein is applicable to any IC design.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of embodiments, those skilled in the art will recognize that the embodiments can be practiced with modification within the spirit and scope of the appended claims.

What is claimed is:

1. A clock generation circuit comprising:
a first waveform generator comprising a counter, said counter being clocked by an input clock signal and further receiving a plurality of output clock signal specifications and generating a pair of first waveform signals based on said output clock signal specifications; and
a deskewer circuit receiving said pair of first waveform signals from said first waveform generator, a pair of second waveform signals from a second waveform generator that is external to said clock generation circuit, and said input clock signal, said deskewer circuit selectively gating said input clock signal with one of said pair of first waveform signals and said pair of second waveform signals in order to generate an output clock signal that is essentially synchronously linked to said input clock signal.

2. The circuit according to claim 1, said output clock signal specifications comprising built-in self-test (BIST) engine supplied output clock signal specifications for BIST operations.

3. The circuit according to claim 1, said output clock signal specifications comprising user supplied output clock signal specifications for one of functional operations and test operations.

4. The circuit according to claim 1, said output clock signal specifications comprising at least one of mode inputs, divide by inputs and width inputs.

5. The circuit according to claim 1, said first waveform generator further comprising a controller in communication with said counter, said controller controlling selection by said counter between generation of said pair of first waveform signals based on built-in self test (BIST) engine-supplied output clock signal specifications and generation of said pair of first waveform signals based on user-supplied output clock signal specifications.

6. The circuit according to claim 5, said controller further locally starting and stopping a free-running clock input on demand without delay.

7. The circuit according to claim 1, said first waveform generator further comprising a clock divider capable of dividing said input clock signal based on said output clock signal specifications.

8. The circuit according to claim 1, said first waveform generator further comprising a controller in communication with said deskewer circuit and controlling selection by said deskewer circuit of one of said pair of first waveform signals and said pair of second waveform signals for gating with said input clock signal.

9. The circuit according to claim 1, said deskewer circuit allowing a same clock path to be used for deskewing both said pair of first waveform signals and said pair of second waveform signals.

10. The circuit according to claim 1, said deskewer circuit comprising:
a pair of gates selecting one of said pair of first waveform signals and said pair of second waveform signals for processing, wherein each of said gates receives one first waveform signal from said first waveform signal generator and one second waveform signal from said second waveform signal generator; and
a first set of parallel connected latches, a second set of parallel connected latches and a multiplexer connected in series for selectively gating said input clock signal with said one of said pair of first waveform signals and said pair of second waveform signals selected for processing in order to generate said output clock signal.

11. The circuit according to claim 10, said deskewer circuit further comprising:
a second pair of gates connected in series between said second set of parallel connected latches and said multiplexer, said second pair of gates allowing selective gating of additional input clock signals during generation of said output clock signal.

12. A clock generation method comprising:
receiving, by a counter of a first waveform generator of a clock generation circuit, output clock signal specifications;
generating, by said counter, a pair of first waveform signals based on said output clock signal specifications;
receiving, by a deskewer circuit of said clock generation circuit, said pair of first waveform signals from said first waveform generator, a pair of second waveform signals from a second waveform generator that is external to said clock generation circuit, and an input clock signal; and
selectively gating, by said deskewer circuit, said input clock signal with one of said pair of first waveform signals and said pair of second waveform signals in order to generate an output clock signal that is essentially synchronously linked to said input clock signal.

13. The method according to claim 12, said output clock signal specifications being supplied by a built-in self-test (BIST) engine for BIST operations.

14. The method according to claim 13, said output clock signal specifications comprising at least one of mode inputs, divide by inputs and width inputs.

15. The method according to claim 12, said output clock signal specifications being supplied by a user for one of functional operations and test operations.

16. The method according to claim 12, further comprising locally starting and stopping a free-running clock input on demand without delay.

17. The method according to claim 12, said generating of said pair of first waveform signals further comprises: dividing said input clock signal based on a divide by input in said output clock signal specifications.

18. A design structure tangibly embodied in a non-transitory storage medium readable by a computer, said design structure comprising data and instructions that when executed by said computer generate a representation of a clock generation circuit, said clock generation comprising:
- a first waveform generator comprising a counter, said counter being clocked by an input clock signal and further receiving a plurality of output clock signal specifications and generating a pair of first waveform signals based on said output clock signal specifications; and
- a deskewer circuit receiving said pair of first waveform signals from said first waveform generator, a pair of second waveform signals from a second waveform generator that is external to said clock generation circuit, and said input clock signal, said deskewer circuit selectively gating said input clock signal with one of said pair of first waveform signals and said pair of second waveform signals in order to generate an output clock signal that is essentially synchronously linked to said input clock signal.

19. The design structure according to claim 18, said design structure comprising a netlist.

20. The design structure of claim 18, said design structure residing on storage medium as a data format used for the exchange of layout data of integrated circuits.

* * * * *